(No Model.)
J. S. GREENLEAF.
SEED PLANTER.
No. 434,267. Patented Aug. 12, 1890.
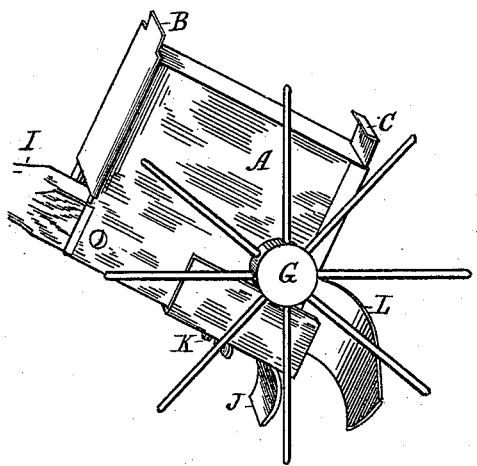
Fig. I.
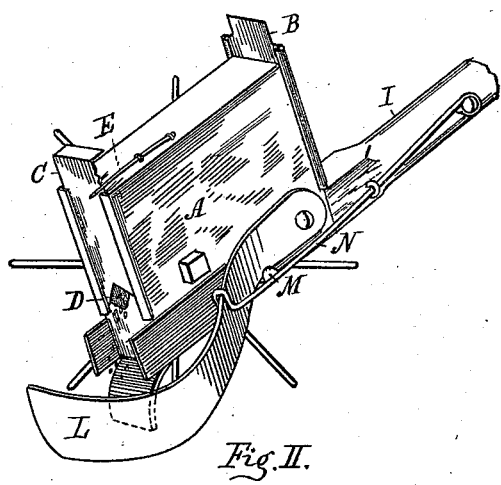
Fig. II.
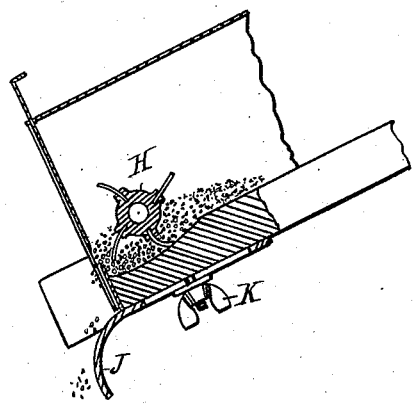
Fig. III.
WITNESSES:
R. S. Millar.
L. M. Adams.
INVENTOR:
J. S. Greenleaf.
By J. Bailey
Attorney.

UNITED STATES PATENT OFFICE.

JONAS S. GREENLEAF, OF FARGO, NORTH DAKOTA.

SEED-PLANTER.

SPECIFICATION forming part of Letters Patent No. 434,267, dated August 12, 1890.

Application filed May 6, 1890. Serial No. 350,750. (No model.)

*To all whom it may concern:*

Be it known that I, JONAS S. GREENLEAF, of Fargo, in the county of Cass and State of North Dakota, have invented a new and useful Improvement in Seed-Planters, which improvement is fully set forth in the following specification and accompanying drawings, in which—

Figure I is a side elevation of my improved seed-planter; Fig. II, a rear perspective view; Fig. III, a sectional view of the agitator and of the interior of the seed-hopper.

My invention relates to improvements in seed-planters; and its object is to provide an inexpensive and useful device, easily operated by hand and designed to obviate the tedious and laborious methods generally employed for planting and covering garden-seeds.

The invention consists of a seed-hopper attached to an ordinary handle and provided with an agitator to prevent the clogging of the seed and insure the regular delivery thereof, an adjustable opening in the rear of the hopper for the discharge of the seed, a plow which may be so adjusted as to open a trench or furrow of the required depth, and a blade or scraper for covering the seed and leveling the soil thereon.

The construction of the device will be understood by referring to the accompanying drawings, in which A designates the seed-hopper, which may be conveniently made of sheet metal. The forward end of the hopper has a slide B for the admission of the seed, and the rear end is provided with a sliding shutter C, which regulates the size of the diamond-shaped orifice D, through which the seed is discharged. This slide is made adjustable by a series of notches on one of its edges, which engage a spring or button E on the top of the hopper.

The planter is mounted on a spur-wheel, which may be easily made of a suitable number of wire spokes attached to a cast metal or wood hub G. The shaft or axle of the wheel passes transversely through the hopper and carries an agitator H, made of rubber in the form of a paddle-wheel. By this means the seed is effectually stirred and conveyed to the orifice D. The handle I, having a squared end, extends through the lower portion of the seed-box and strengthens it. The plow J is attached by a thumb-screw K to the under side of the hopper, and has a longitudinal slot by which its position may be altered and the depth of the furrow regulated at will. The forward end of the scraper L is pivoted on the side of the seed-box and has a limited vertical movement. In its normal position it rests on the pin M, and is kept in contact therewith by a wire spring N.

I am aware that an adjustable plow in devices of this general description is not new, nor an adjustable covering device or scraper, nor an agitator in the said hopper moved by the wheel-axle.

What I claim as new is—

In a seed-planter, the plow J, attached to the under side of the hopper and adjustable by thumb-screw K, the scraper L, pivoted on the side of the seed-box so as to have a limited movement and kept in contact with the pin M by spring N, in combination with the seed-hopper having an adjustable orifice for discharging the seed, and a spur-wheel the axle of which passes through the hopper and operates the agitator therein, all substantially as described.

In testimony that I claim the foregoing I have hereunto set my hand, this 28th day of April, 1890, in the presence of witnesses.

JONAS S. GREENLEAF.

Witnesses:
WILLARD A. REGAN,
C. E. JOSLIN.